UNITED STATES PATENT OFFICE.

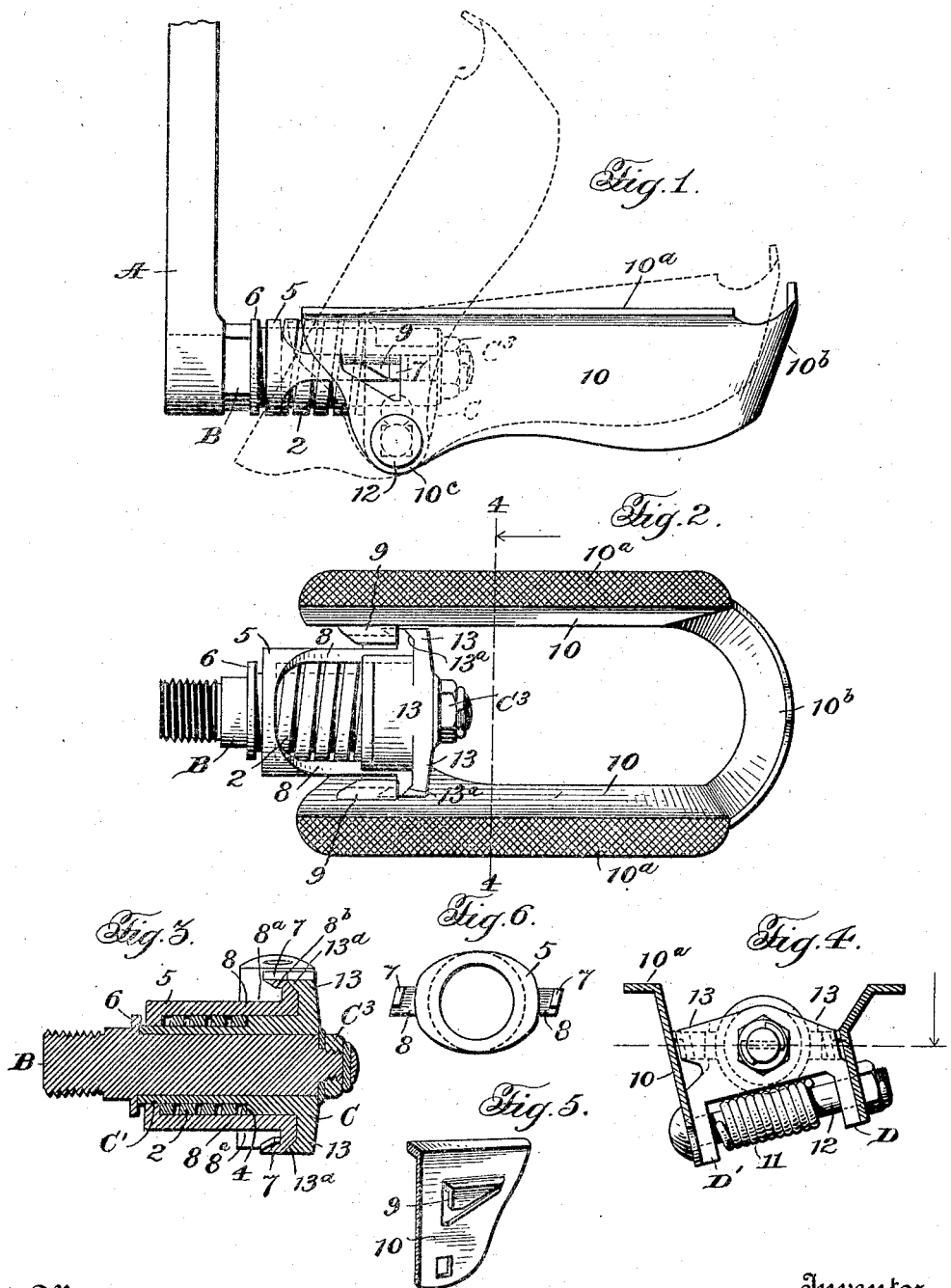

FRANK D. WARREN, OF COLORADO SPRINGS, COLORADO, ASSIGNOR TO THE CYCLE SUPPLIES COMPANY, OF COLORADO SPRINGS, COLORADO, A CORPORATION OF COLORADO.

PEDAL FOR CYCLES.

1,276,139.

Specification of Letters Patent.   Patented Aug. 20, 1918.

Application filed March 9, 1916.   Serial No. 83,098.

*To all whom it may concern:*

Be it known that I, FRANK D. WARREN, a citizen of the United States, residing at Colorado Springs, in the county of El Paso and State of Colorado, have invented certain new and useful Improvements in Pedals for Cycles, of which the following is a specification, reference being had therein to the accompanying drawings.

This invention relates to an improvement in foldable pedals, designed for use in connection with cycles, and especially with motorcycles. Heretofore, it has been proposed to provide a pedal structure with a pedal or foot part pivotally associated with the shank, so that the pedal could be folded upwardly, and in United States Letters Patent No. 1,087,258, dated February 17, 1914, there is disclosed a foldable pedal with means for yieldingly maintaining the pedal in service position but permitting the same to be folded up under impact.

In the pedal structure disclosed in the said patent a counterweighted pedal frame is employed, the tendency of which is to maintain the tread surface of the pedal upwardly presented so that on the application of the foot to the pedal the pressure would be in a direction opposed to the foldable direction of the pedal. Owing to the fact that the pedal was always free to revolve on its spindle or hub, manifestly should the pedal, while spinning, come in contact with a stationary object it would not flex if the tread surface were lowermost. Again, were the machine to tip sidewise, there was a tendency for the end of the pedal to resist flexing, especially if it encountered a surface which could be penetrated, which would necessitate the kicking out or movement of the machine to enable the pedal to flex or bend.

The present invention possesses numerous essential characteristic features designed primarily to render a folding pedal useful for cycle purposes and which will overcome the possible objections suggested as to the structure disclosed in the aforementioned patent.

One of the primary and distinctive features of the present invention is that the pedal is self-locking against rotation whereby the upper surface of the same is held mechanically and positively in its proper service position.

A further object is the provision of a foldable pedal spring positioned with means for slightly offsetting the pedal from service position so that it will assume an oblique angle when not in use and thereby permit a very prompt and ready folding of the pedal when obstructions are encountered.

Another object of the invention is that of stabilizing the structure by preventing spinning of the pedal, thus avoiding what may be termed the erratic behavior of a folding pedal, which after being struck, furiously spins, thereby developing the element of chance during spinning, of being bent or broken when coming in contact with a stationary object.

A further object of the invention is to so fashion the structure that a horizontal tread surface is maintained, while the front of the pedal is at an incline, thereby securing the advantages of a tilted pedal, as disclosed in the aforementioned patent, while maintaining the horizontal position of the foot rest or grip. It will be seen that by the construction hereinafter referred to the advantages of the tilting foot rest of the said patented structure is acquired by the present construction, while in addition thereto, the normal position of the outer end of the pedal is slightly flexed so that the pedal will respond promptly to any undue shocks or impacts.

In the accompanying drawings there is shown a form of pedal structure embodying the invention, but it is to be understood that the principles involved are susceptible of widely different application and can be embodied in various forms of structure without departing in the least from the general and underlying principles of the invention.

In the drawings:

Figure 1 is a side elevation of a foldable pedal showing the pedal frame in the position it assumes when power is applied to the upper surface thereof. In this figure there is shown in dotted lines the normal position, and the position the pedal will assume when struck by an object.

Fig. 2 is a top plan view of the construction shown in Fig. 1;

Fig. 3 is a cross section through the hub part of the device showing the parts in position when in service;

Fig. 4 is a cross section on the line 4—4 of Fig. 2;

Fig. 5 is a detail perspective view of a hook portion of the pedal, the view being taken from the inner side of one of the sides 10 of the pedal frame, and Fig. 6 is a detail elevation of the friction yoke.

In the drawings, A represents the shank and B the spindle secured thereto. This spindle may be of cylindrical, cone or ball type, as conditions require, but for convenience it is shown as the cylindrical type. Mounted on the spindle B, is a hub C, having a reduced cylindrical part C' terminating in a shoulder 4. The hub is secured on the spindle by a suitable nut and washer, as at $C^3$, and the spindle is provided with an outstanding circular flange 6 against which the inner end of the hub abuts, the flange extending radially beyond the plane of the hub, as shown in Fig. 2. The hub C is provided at its outer end with lateral arms 13, the outer end parts of which are provided with inclined flanges $13^a$ for purposes presently to be described.

Depending from the under side of the hub, at opposite sides of the center, are perforated ears D and D', the latter being extended downward a distance beyond the horizontal plane of the end of the former as shown in Fig. 4. The apertures in the ears D, D', are in alinement so that the same may receive, with exactness, a pivot bolt 12, upon which is sleeved a spring 11. One end of the spring is made fast to the bolt, while the opposite end engages the hub in a manner to normally hold the pedal frame downward. 10 represents the pedal frame, which is conveniently formed of a single piece of metal, bent to form a U-shaped frame, having an outstanding tread surface $10^a$, on its opposite edges, and a curved front part $10^b$. The rear of the sides of the pedal frame 10 are extended downward, as at $10^c$, and suitable openings are made therein through which the bolt 12 passes, there being, by preference, a squared or keyed connection between one end of the bolt and the pedal frame, so that the bolt will turn with the frame, thereby causing the spring 11 to normally retain the pedal in substantially horizontal position, as shown in Fig. 1.

To limit the downward movement of the outer end of the pedal, suitable stops or hooks 9 are formed, conveniently from the metal of the side bars or frame 10, as shown in Fig. 5, the vertical sides of which are presented outwardly toward the outer end of the pedal frame. These hooks or stop members are normally positioned directly in the rear of the flanged end part of the arms 13, and by virtue of the shape of the hook or stop member 9, the flanged part of the arms, when associated with the hook members, presently to be described, serve to unite the hub and frame sides at the rear when the pedal is in service. By this interlocking or hooking of the parts, the side frames of the pedal are prevented from spreading, thereby enabling the employment of relatively light metal or material for the sides of the frame, while maintaining the sides in their proper relative positions, when under pressure.

Mounted on the cylindrical reduced portion of the hub, is a yoke member 5, having its rear part of substantially circular formation and fitting closely the reduced cylindrical part, but having a longitudinal movement thereon. Extending from the part 5 forward, are oppositely arranged branches 8, slidably mounted in grooves $8^a$ in the larger part of the hub portion. The outer ends of the branches 8 have outstanding flange parts $8^b$, fashioned to engage the flange parts $13^a$. The ends of the branches are formed with hook ends 7, as shown in Fig. 3. Interposed between the flange part of the yoke and the shoulder 4 of the hub, is a stiff spring 2, tensioned to normally set the base of the yoke tight against the projecting flange 6 of the spindle. The hook ends 7 of the yoke extensions 8 are designed, as above stated, to take in behind the stop flanges 9 on the side bars of the frame, and are beveled at their outer ends to engage back of the flanges $13^a$ of the arm 13. By this arrangement and combination, the hooks 7 are interlocked with the hub, and are secured against spreading when pressure is placed on the pedal.

To maintain a horizontal tread surface at all times, and at the same time present an inclined forward side for deflecting purposes when obstacles are encountered, the oblique pivotal connection between the frame and the hub is formed, and likewise the forward side bar of the frame is inclined slightly and is of less depth than the rear side bar. To permit the inclination of the side bars, as shown, it is necessary to incline the hooks 7 slightly, as shown in Fig. 6. This will enable the hooks to engage back of the stop hooks 9 on the frame.

It will be noted that the interlocking connection between the yoke hooks and the side bars of the frame, through the stops 9, is on a plane above the plane of the point of pivoting the frame to the hub, and therefore, any drawing action or pulling on the frame above the pivot in the direction of the shank, will have a tendency to slightly elevate the outer end of the frame, as shown in dotted lines, Fig. 1. The spring 2, after pressure is taken from the pedal immediately forces the yoke toward the flange 6 of the spindle and presses the face of the yoke closely against the flange, thereby creating a frictional contact which will retain the pedal frame in the position in which it was left when the foot of the operator is removed and prevent spinning. By the backward movement of the yoke and consequent slight tilting of pedal frame, the latter will normally be held in a position where it will be at an incline to the axis of the hub and readily flex or bend back when it encounters a resisting object. The spring 2 may be characterized as an element which performs two functions. First, the holding of the pedal against spinning by frictionally locking the same in its operative service position, and second, giving to the pedal a preliminary tilt.

It will also be noted that as the pedal swings up into the higher position shown in dotted lines, Fig. 1, the stops 9 leave the hook parts of the yoke, and upon returning will drop back of the hooks for future service, the spring 11 causing the same to immediately assume such a position.

These features are important in structures of this type as the operator has at all times an assurance that when his foot is removed from the pedal, the pedal treads will be in a position for again receiving the foot, and when in that position will promptly flex should the machine fall or should the pedals come in contact with bricks or stones, or the surface while the operator has removed his foot from the pedal. Pedals of this type are generally used on what is known as the coaster-brake type of machines, wherein the cranks are not turned by the forward movement of the machine.

In operation, the pedal is in position for service, and upon the operator pressing thereon the same will assume the position shown in full lines, Fig. 1, the friction lock is released and the pedal is free to rotate without resistance. As soon as the operator removes his foot the pedal assumes an inclined position and is readily flexed upward when engaging any stationary object. When the pedal is released from the pressure tending to press it upward it will by virtue of the strength of spring 11 be forced downward into its normal slightly upwardly inclined position, as shown in dotted lines in Fig. 1. It can go no farther owing to the fact that the stops or projections 9 come in contact with the projections or hook points 7, and thus form stops. In this respect it should be noted that the pedal frame pivots from a point below the stops and is free to tilt upward carrying the hooks or stops 9 slightly back of the flanges or hooks 7. The operator when applying pressure to the pedal releases the friction hold. Damage to the pedal parts is thus prevented and at the same time the resisting spring 11 serves as a means for absorbing the shocks, preventing injury to the machine or parts of the motor mechanism.

Having thus described the invention, what I claim as new and desire to secure by Letters Patent is:

1. In a cycle pedal and in combination with a crank arm, a pedal pivotally supported thereon, and means for locking the pedal against rotation when pressure is removed therefrom.

2. In a cycle pedal, the combination with a crank arm, of a pedal rotatively mounted on the arm, and means acting automatically to lock the pedal against rotation on the arm when pressure is removed from the pedal.

3. In a cycle pedal, the combination with a crank, a spindle and a hub, a pedal hinged to the hub, means for yieldingly maintaining the pedal in a lowered position, and means for locking the pedal against rotation when pressure is removed therefrom.

4. A pedal structure comprising a hub member, a spindle member, a pivoted pedal part, and means for locking the pedal to the spindle to prevent rotation when pressure is removed from the pedal.

5. In a cycle pedal, the combination with a spindle part and a hub part, of a pedal hinged to the hub part, and means for normally locking the pedal against rotation on the spindle when pressure is removed from the pedal.

6. In a pedal for cycles, means adapting said pedal to fold upwardly when meeting obstacles, a spring for normally retaining the pedal in a lowered position, and means for locking the pedal against rotation when pressure is removed therefrom.

7. In a pedal for cycles, means adapting said pedal to fold upward when meeting obstructions, means for normally holding the pedal downward, and yielding means for limiting the downward movement of the pedal.

8. In a pedal for cycles, means adapting said pedal to fold upward when meeting an obstruction, means for resisting the upward movement of the pedal, and a spring for normally tilting the pedal obliquely and for locking the same against rotary movement.

9. A hinged pedal adapted to fold up when colliding with an obstruction, means for normally yieldingly holding the pedal in lowered position, means for limiting the downward movement of the pedal, and yielding means for normally tilting the pedal when pressure is removed therefrom.

10. A hinged pedal adapted to fold up when colliding with an obstruction, means for normally yieldingly holding the pedal in lowered position, means for limiting the downward movement of the pedal, and yielding means for normally tilting the pedal when pressure is removed therefrom and for locking the same against rotation.

11. In a cycle pedal, the combination with a hub, of a pedal hinged thereto, and means for normally tilting the pedal comprising a yoke member arranged on the hub, a spring for moving the yoke, and a part on the pedal frame for engaging said yoke.

12. In a pedal structure the combination with a hub, of a pedal frame hinged thereto below the plane of the hub, and means engaging the pedal frame above the pivot point for normally tilting the pedal.

13. In a pedal construction, the combination with a hub and a spindle carrying the same, of a pedal frame pivotally supported by the hub, a spring sleeved on the hub, and means operated by the spring for locking the pedal against rotation on the hub when pressure is removed from the pedal.

14. The combination with a hub having arms on its outer end, of a yoke slidably mounted on the hub and having hook shaped extensions engaging the arms, a spring interposed between the hub and the yoke, a pedal frame pivotally supported on the hub, and means located above the plane of the pivot and engaged by the yoke hooks for tilting the pedal.

15. The combination with a spindle, of a hub sleeved thereon, a yoke on the hub, a spring interposed between the yoke and the hub, a flange on the spindle, a pedal frame pivotally supported on the hub, and means on the yoke for engaging the pedal frame above the pivot point for limiting the downward movement of the pedal frame on its pivot and for normally tilting the pedal.

16. In a pedal structure, the combination with a hub, of a pedal frame pivotally supported on the hub and comprising side bars of different widths, and an obliquely arranged pivot pin for uniting the frame to the hub.

17. In a pedal structure, the combination with a hub having depending ears arranged on different horizontal planes, a pedal frame, an obliquely arranged pivot member uniting the frame to the ears, and means for resisting the downward movement of the pedal.

18. In a pedal structure, the combination with a hub having outwardly projecting arms formed with rearwardly extending flange parts, of a sliding yoke member having outwardly extending hook parts engaging the said flange parts of the arms, a spring interposed between the yoke and the hub, a pedal frame pivotally supported on the hub and having offset hook stops arranged to be engaged by the hook parts of said yoke, and means for normally holding the pedal in lowered position.

19. In a pedal structure, the combination with a hub part, of an open pedal frame pivotally supported on the hub part, projections extending outward from the hub and having hook parts, and overhanging stop projections on the frame part with which the hook parts engage.

20. In a folding pedal structure the combination with a hub, of a pedal part hinged thereto for upward deflection, a spring for normally holding the pedal in service position, grips normally held in a horizontal plane and positioned on the upper part of the pedal structure, the forward side of the pedal structure being of less width than the rear, for purposes specified.

21. A pedal structure comprising a frame having its side bars below the tread surface inclined forwardly, and means for supporting the pedal frame.

22. A pedal construction comprising a frame having a tread surface, the forward bar of the frame terminating at a point above the lower edge of the rear part of the frame, substantially as described.

In testimony whereof I hereunto affix my signature in the presence of two witnesses.

FRANK D. WARREN.

Witnesses:
S. J. WALKER.
J. ALFRED RITTER, Jr.

Copies of this patent may be obtained for five cents each, by addressing the "Commissioner of Patents, Washington, D. C."